G. H. LENHER.
Churn.
No. 60,391. Patented Dec. 11, 1866.
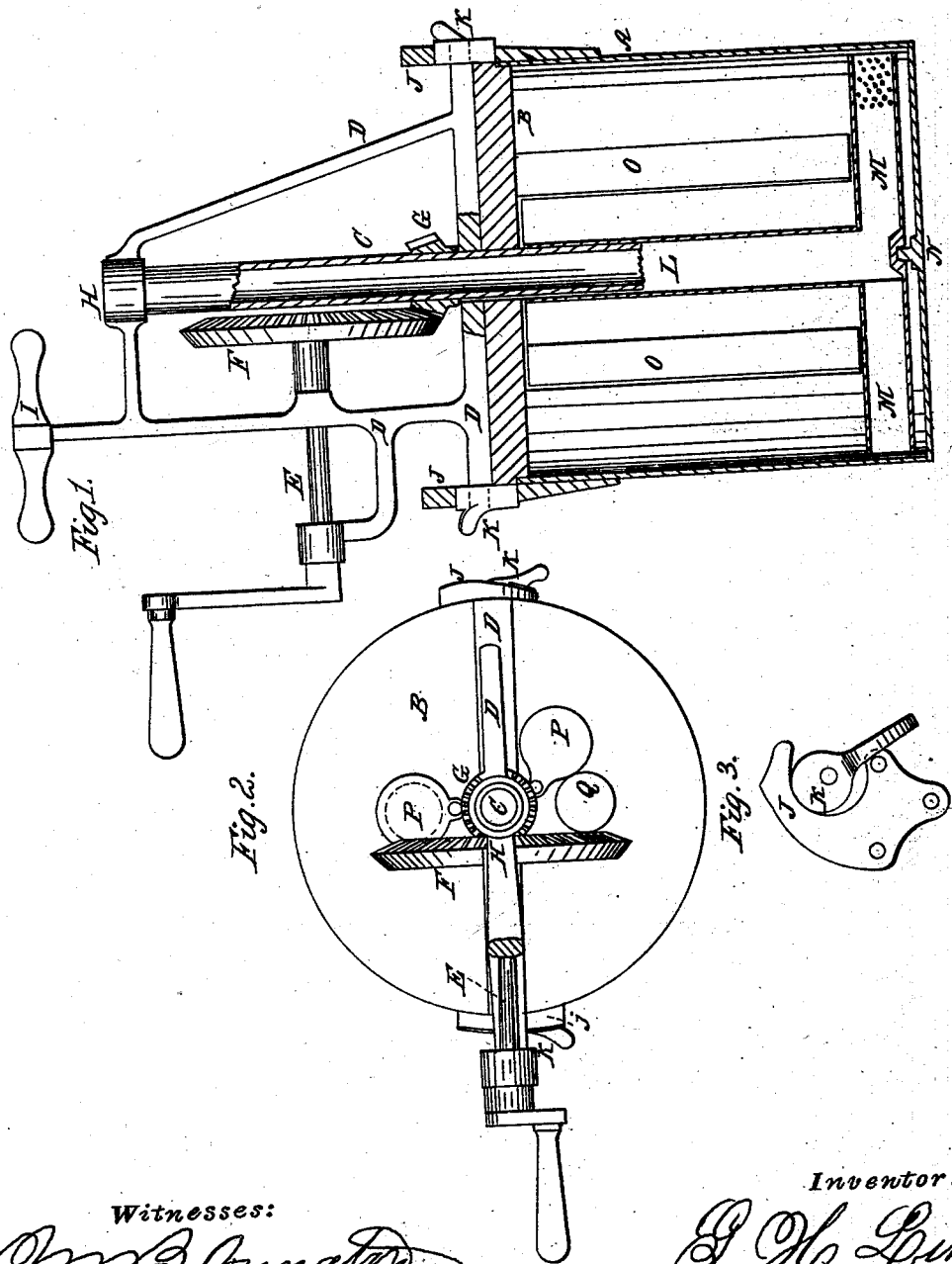
Witnesses:
Inventor:

United States Patent Office.

IMPROVEMENT IN CHURNS.

GEORGE H. LENHER, OF RICHMOND, VIRGINIA.

Letters Patent No. 60,391, dated December 11, 1866.

---

The Schedule referred to in these Letters Patent and making part of the same.

---

TO ALL WHOM IT MAY CONCERN:

Be it known that I, GEORGE H. LENHER, of Richmond, in the county of Henrico, and State of Virginia, have invented a new and useful Improvement in Churns; and I do hereby declare that the following is a full, clear, and exact description thereof, which will enable others skilled in the art to make and use the same, reference being had to the accompanying drawing, forming part of this specification, in which—

Figure 1 is a vertical section of a churn made according to my invention.

Figure 2 is a plan.

Figure 3 is a detailed view, showing how the cover is fastened on.

One of the objects of this improvement in churns is the supplying of air from the outside, and mixing it with the milk and cream through a hollow spindle and hollow dashers, one side of the latter, near their ends, being perforated. The milk and cream are resisted in their tendency to acquire a rotary motion by fixed counter-dashers which extend downward from the under side of the cover. The cover is fastened on by means of cams which work in hooks that rise from opposite sides of the body of the churn.

A designates the body of a churn, and B its cover. The latter has two perforations, Q Q, which are closed by swinging covers P P. From opposite sides of the churn arise hooks J, which, in connection with cams K K, fastened on opposite sides of the cover, serve to fasten the cover to the body of the churn. D is a metallic frame secured on the top of the cover, and rising therefrom, as shown in the drawing. The lower part of the frame is a flat piece that extends across the cover diametrically, and carrying on its ends cams K K, which are carried into the hooks J J by turning the cover in a horizontal direction after it is fitted on the body of the churn, the open sides of the hooks K K being presented in opposite directions for this purpose. The highest part of the frame D has a handle I, which enables one to remove the cover with ease; and just below the level of the handle is a collar H, supported by the frame, in which is inserted the upper end of a hollow revolving spindle C that extends downward therefrom through the bottom plate of frame D and through the cover, below which it is made of a square form, fitting within the upper end of the square tube or spindle L, that rises from the lower part of the churn. This tube or spindle L communicates at its lower end with a horizontal tube M, open at both ends, and whose length is nearly equal to the diameter of the lower part of the churn. The horizontal tube M forms the dashers of the churn, and it rotates upon a pivot N, rising from the bottom of the churn. The dashers are made to revolve by means of the fitting together of the square tubes or spindles C and L, which, together, form one hollow shaft or spindle, which communicates with the dashers M M. The dashers are perforated near their ends with numerous holes made on the sides, which are in the rear when the dashers are in motion. Motion having been given to the dashers, a partial vacuum is formed behind them, which causes the air in the dashers M to flow out through their perforations, and the air so withdrawn from the dashers is supplied through the hollow shaft L C. Thus a constant stream of fresh air is brought from above into the churn and delivered in the midst of the mass of milk and cream at the lower part of the churn. The air being lighter than the milk and cream, seeks to liberate itself and rises through them in minute bubbles, causing a foam on the surface of their mass. O O are broad plates of metal, or other suitable material, which extend down from the under side of the cover B nearly to the level of the dashers. The masses of the cream and milk are dashed with violence against the fixed counter-dashers O O, and the rotation of such masses is thereby prevented, so that the action of the dashers M upon the contents of the churn is constant, which would not be the case were such masses allowed to rotate continually with the dashers. Upon the hollow shaft C, above the cover, is fixed a bevel-gear G, which is engaged by a larger bevel-gear F, on a horizontal shaft E, which has bearings in frame D. This shaft may be rotated by means of a crank, and thus the dashers are put in motion.

I claim as new, and desire to secure by Letters Patent—

1. The arrangement of the hollow spindle L, perforated rotating tube M, and vertical fixed counter-dashers o o, constructed and operating in the manner and for the purpose herein described.

2. I also claim fastening on the covers of churns by means of hooks on opposite sides of their bodies, and of revolving cams on the edges of the covers, substantially as described.

GEO. H. LENHER.

Witnesses:
 A. McCURDEY,
 GEO. W. SIZER.